US008214059B1

(12) United States Patent
Petrocy et al.

(10) Patent No.: US 8,214,059 B1
(45) Date of Patent: Jul. 3, 2012

(54) SELF-ADDRESSING CONTROL UNITS AND MODULAR SIGN INCLUDING PLURALITY OF SELF-ADDRESSING CONTROL UNITS

(76) Inventors: Richard J. Petrocy, Carteret, NJ (US); Joseph E. Sidoti, Reeders, PA (US)

( * ) Notice: Subject to any disclaimer, the term of this patent is extended or adjusted under 35 U.S.C. 154(b) by 0 days.

(21) Appl. No.: 08/807,567

(22) Filed: Feb. 28, 1997

Related U.S. Application Data

(60) Provisional application No. 60/012,565, filed on Feb. 29, 1996, provisional application No. 60/012,545, filed on Feb. 29, 1996, provisional application No. 60/012,541, filed on Feb. 29, 1996.

(51) Int. Cl.

| | |
|---|---|
| ***G05B 19/18*** | (2006.01) |
| ***G05B 23/02*** | (2006.01) |
| ***G06F 12/00*** | (2006.01) |
| ***G09F 13/04*** | (2006.01) |
| ***G09F 15/00*** | (2006.01) |
| ***G09G 3/04*** | (2006.01) |
| ***G09G 3/20*** | (2006.01) |
| ***G09G 5/39*** | (2006.01) |

(52) U.S. Cl. ................. 700/3; 40/575; 40/605; 340/3.5; 345/33; 345/55; 345/532; 345/564

(58) Field of Classification Search .................. 364/130, 364/131, 133, 135, 136, 140.03, 140.1, 148.02; 365/110, 57; 318/6; 352/174, 180; 353/109; 40/471, 611, 617, 618, 524, 575, 605, 752; 340/815.24, 3.5; 345/166, 126, 152, 163, 345/162, 33, 55, 564, 530–532; 700/2, 3

See application file for complete search history.

(56) References Cited

U.S. PATENT DOCUMENTS

| | | | | |
|---|---|---|---|---|
| 3,573,790 | A * | 4/1971 | Schulenburg et al. | 345/57 |
| 5,061,921 | A * | 10/1991 | Lesko et al. | 340/815.24 |
| 5,184,116 | A * | 2/1993 | Daugherty et al. | 345/109 |
| 5,254,908 | A * | 10/1993 | Alt et al. | 315/312 |
| 5,457,478 | A * | 10/1995 | Frank | 345/158 |
| 5,459,477 | A * | 10/1995 | Fukuda et al. | 345/2.1 |
| 5,519,829 | A * | 5/1996 | Wilson | 345/530 |
| 5,523,769 | A * | 6/1996 | Lauer et al. | 345/1.3 |
| 5,530,322 | A * | 6/1996 | Ference et al. | 315/295 |
| 5,539,623 | A * | 7/1996 | Gurz et al. | 362/20 |
| 5,565,843 | A * | 10/1996 | Meyvis | 340/545 |

(Continued)

FOREIGN PATENT DOCUMENTS

EP 136178 A2 * 4/1985

(Continued)

*Primary Examiner* — Albert Decady
*Assistant Examiner* — Jennifer L Norton
(74) *Attorney, Agent, or Firm* — Stanley H. Kremen

(57) ABSTRACT

A self-addressing control unit system and method for controlling a sequence of or an array of display signs comprising of a remote or master controller and a plurality of control units interconnected by a physical or logical parallel electrical bus having multiple connections to transfer data or power between the plurality of control units; wherein the electrical bus further comprises of a main broadcast line, an addressing line and a feedback line to every control unit. The remote or master controller transmits an initial address to a first of the plurality of control units on the addressing line of the bus where a calculator or computer within each of the plurality of control units computes its own address by performing a mathematical operation that changes the initial address by adding a constant of one to the address received to produce its own new address.

3 Claims, 20 Drawing Sheets

U.S. PATENT DOCUMENTS

| | | | | | |
|---|---|---|---|---|---|
| 5,583,754 | A | * | 12/1996 | Leonhardt et al. | 700/3 |
| 5,588,238 | A | * | 12/1996 | Visocky et al. | 40/618 |
| 5,717,424 | A | * | 2/1998 | Simson et al. | 345/57 |
| 5,726,668 | A | * | 3/1998 | Clement | 715/723 |
| 5,757,353 | A | * | 5/1998 | Yokota et al. | 345/685 |
| 5,767,818 | A | * | 6/1998 | Nishida | 345/1.1 |
| 5,796,376 | A | * | 8/1998 | Banks | 345/82 |
| 6,025,840 | A | * | 2/2000 | Taylor | 715/790 |
| 6,088,008 | A | * | 7/2000 | Reeder | 345/33 |
| 6,097,351 | A | * | 8/2000 | Nishida | 345/1.3 |
| 6,593,902 | B1 | * | 7/2003 | Ogino et al. | 345/55 |
| 6,605,902 | B2 | * | 8/2003 | Shimoda et al. | 315/169.1 |
| 6,646,646 | B2 | * | 11/2003 | Peterson et al. | 345/543 |
| 2001/0006375 | A1 | * | 7/2001 | Tomooka et al. | 345/4 |
| 2004/0015268 | A1 | * | 1/2004 | Kato et al. | 700/275 |
| 2005/0128100 | A1 | * | 6/2005 | Petrocy | 340/825.52 |
| 2006/0030951 | A1 | * | 2/2006 | Davlin et al. | 700/3 |

FOREIGN PATENT DOCUMENTS

| | | | | |
|---|---|---|---|---|
| JP | 05173499 | A | * | 7/1993 |
| JP | 05344137 | A | * | 12/1993 |

* cited by examiner

CONTROL PCB

| DESCRIPTION | QTY | MFGR. | P/N | NOTES |
|---|---|---|---|---|
| RES, 240, I/4W, 5% | 2 | ANY | | |
| RES, 160, I/4W, 5% | 1 | ANY | | |
| RES, 100, I/4W, 5% | 1 | ANY | | |
| CAP, 4700UF, 25V, ELEC | 1 | PANASONIC | ECE-B1EU472 | |
| CAP, 100UF, 63V, ELEC | 1 | PANASONIC | ECE-A0JU101 | |
| CAP, 1UF, 50V, MONO | 1 | ANY | | |
| IC, REG, 5V | 1 | ANY | A7805 | |
| IC, PIC16C84-04/P | 1 | MICROCHIP | PIC16C84-04/P | |
| OPTO, ISO, 4 CHANNEL | 1 | SEIMENS | ILQ621 | |
| IC, H-DRIVER, 2 CHANNEL | 1 | SGS | L298N | |
| REC, BRIDGE | 1 | GI | W005G | |
| DIODE, 1N4004 | 4 | ANY | IN004 | |
| LUGS, SPADE | 20 | KEYSTONE | I281 | |
| JACK, POWER | 2 | AMP | 350759-4 | |
| HEADER, 4 PIN | 1 | CFX | | |
| XFORMER | 1 | MAGNETEK | PS12-1600 | |
| HEATSINK, TO-220 | 1 | | 57404B | |

MISC.

| DESCRIPTION | QTY | MFGR. | P/N | NOTES |
|---|---|---|---|---|
| CAP, .1UF, 50V, MONO | 2 | ANY | | FOR MOTOR |
| PLUG, POWER | 2 | ANY | I-480698-0 | FOR MOTOR AND LAMP |
| OPTO, REFLECTIVE | 1 | OMRON | EE-SB5 | |
| PINS, POWER | 4 | AMP | 350706-1 | |

*FIG. 22*

SELF-ADDRESSING CONTROL UNITS AND MODULAR SIGN INCLUDING PLURALITY OF SELF-ADDRESSING CONTROL UNITS

This is a continuation-in-part of copending provision application(s):

Ser. No. 60/012,565 filed on Feb. 29, 1996

Ser. No. 60/012,545 filed on Feb. 29, 1996

Ser. No. 60/012,541 filed on Feb. 29, 1996

RELATED APPLICATIONS

This application claims the benefit of U.S. Provisional Application Ser. Nos. 60/012,565, 60/012,545, and 60/012, 541 filed Feb. 29, 1996. The entire disclosures of the applications are expressly incorporated herein by reference.

BACKGROUND OF THE INVENTION

1. Field of the Invention

The present invention relates to a protocol for self-addressing control units, and more particularly to a modular sign comprising a plurality of self-addressing control units positioned side by side to form an array, each of the control units having a mechanical sign mechanism for displaying one of a plurality of characters to display a message on the array, which sign can be controlled from a remote location to change the characters displayed by the control units to create and change messages on the sign. Additionally, the present invention relates to the use of a protocol for self-addressing control units for application in any field wherein a plurality of control units are used in a system. Additionally, the present invention relates to a method and apparatus for installing a plurality of control units to form an array.

2. Related Art

In the past signs have been made to have a single image thereon for the life of the sign. Of course, the entire face of the sign could be replaced with a new face. Additionally, it is known to provide signs that can be backlit and have, on the face thereof, slots for holding individual clear panels with characters thereon so that such characters can be arranged to form words. This type of sign is used on movie theater marquees to display the names of the movies playing at the theater, and the times that would such movies are scheduled to begin. However, this type of sign is difficult to install. Additionally, in order to change the names on the sign, one needs to either lower the sign down to ground level or use a ladder to climb up to the sign and remove the panels from the sign and put on new panels bearing the proper characters to spell the proper word to indicate the name of a new movie. Besides being dangerous, this procedure is time intensive. Additionally, this process must be performed frequently, such as on a weekly basis, which compounds the amount of time involved. There is additional time involved in replacing fluorescent bulbs which provide the back lighting for the sign as they burn out.

A prior attempt at overcoming these problems is found in Lesko, et al., U.S. Pat. No. 5,061,921 disclosed a remote-controlled message sign which is controlled by a pager which receives radio signals from a paging service and provides output signals in response to the radio signals. The output signals of the pager are used to control one or more drive motors which move a multiple position message device to a desired position. The display device includes a wheel or drum having an outer cylindrical surface and an axle and is rotatably mounted on the sign. A motor drive rotates the wheel to position the desired letter or number in the window of the sign. A position data reader on the drum determines the position of the drum relative to the window of the sign. However, this does not overcome all of the problems in the prior art.

Another attempt at providing an automatically changeable display sign is disclosed in Daugherty, et al., U.S. Pat. No. 5,184,116 for a back-lightable diffusive sign for displaying alphanumeric characters and graphics comprising a plurality of mechanically moveable elements, each have a dark translucent face and a bright translucent face which are moveable from one to the other face interchangeably by a series of electromechanical driving elements. However, this sign does not overcome all the problems associated with the signs of the prior art.

Accordingly, what is desired, but has not heretofore been achieved, is a sign for displaying messages which messages can be inexpensively and easily changed from a remote location.

Additionally, it has been known is the past to provide a series of control units, such as computers, computer networks, or other controllers, for performing a desired function. In the past, efforts at coordinating the outputs of the various control units involved wiring each separate control unit directly to a main controller to form an electrical and mechanical link. Such a method however, is expensive based on the wiring involved. Another method of linking the control units together is by means of multiplexing which involves an array of many "X" and "Y" connecting wires from the main controller to each of the control units. Further, it is known to serially or sequentially link a main controller to control units by having the installer set switches on each of the control units. Indeed, many of the networking cards currently in use in computer networks are configured by the manufacturer to have a certain switch sequence for identification purposes, and these control units are mixed and matched, but the problem sometimes arises that more than one control unit has the same identification number and causes confusion in the network. All of these methods are material intensive in terms of wires and/or labor intensive and/or require expert installers to understand and install each system and/or are limited by the manufacturer of the units.

Accordingly, what is desired, and has not heretofore been invented is a control unit capable of using one single data path (one wire or parallel wires or fiber optic or radio path) where all of the units are addressed sequentially and set their own addresses based on the referencing of the prior unit to self-address and to self-install without the aid of a technician.

Additionally, in the past there has been a problem with hanging signs and running electricity thereinto. Signs had to be separately, mechanically, installed and separately, electrically, interconnected. For modular signs there has been a problem installing a plurality of units need at an even and aligned position. It is difficult to achieve such alignment because of the measuring that must take place to insure that units are mounted at a aligned height with proper spacing therebetween.

Accordingly, what is needed, and has not heretofore been available, is a method for mounting and electrically connecting a plurality of units which compensates for improper installation.

OBJECTS AND SUMMARY OF THE INVENTION

It is a primary object of the present invention to provide a protocol for self-addressing control units.

It is an additional object of the present invention to provide self-addressing control units which periodically re-address themselves.

It is a further object of the present invention to provide self-addressing control units which look at the previous control unit identification, add a one thereto, and store the result as the address of the control unit.

It is still a further object of the invention to provide a plurality of self-addressing control units which do not require dip switches or custom program chips for addressing.

It is an additional object of the present invention to provide control units which do not have to be set up by a skilled electrician or a computer installer.

It is an additional object of the present invention to provide an array of self-addressing control units wherein if one control unit is damaged, the remaining control units can continue to operate separately and independently.

It is another primary object of the present invention to provide a modular sign comprising a plurality of self-addressing control units, wherein each of the control units can display a character to form a message on the modular sign.

It is an additional object of the present invention to provide a sign comprising a plurality of self-addressing control units to provide a message which message can be remotely controlled and remotely changed.

It is an additional object of the present invention to provide a modular sign having a plurality of control units which may be controlled by a telephone modem interface.

It is an additional object of present invention to provide a modular sign having a plurality of self-addressing control units which may be controlled by a pager interface.

It is another primary object of the present invention to provide a method and apparatus for installing a plurality of control units to form an array.

It is another object of the present invention to provide an installation apparatus which includes mechanical attachment means and electrical communication means integrated into one unit.

It is an additional object of the present invention to provide a method and apparatus for installation of a plurality of control units to form a modular sign which does not require a wire harness.

It is an additional object of the present invention to provide a method and apparatus for installing an array of control units to form a modular sign which includes a "reverse" bus system.

It is an additional object of the present invention to provide an array of control units having a reverse bus system, wherein the bus is formed on circuit boards within the control units, and the control units are interconnected other adjacent control units by electrical contacts within the installation brackets.

It is an additional object of the present invention to provide a method and apparatus for installing an array of self-addressing control modules which can be installed by one who is not skilled in the sign installation business and one who is not a skilled electrician.

These and other objects are achieved by the protocol for self-addressing control units of the present invention. The protocol is effected by arranging a plurality of control units in a sequence and running a line from a master controller with links off the line to each control unit. Additionally, a feedback line is provided in the reverse direction for each control unit to communicate backwards with the previous unit. The master controller sends out a signal to identify itself as 00 and the control units down the line address and identify themselves by adding a 1 to the number that it sees. Accordingly, the first control unit addresses itself as 1, the second control unit addresses itself as 2, etc. This protocol can be implemented on a row by row basis, or in one line extending through a plurality of rows. This protocol has applicability to modular signs as well as other fields of application of wherein a number of control units are linked together such as a computer networking, prosthetics, etc.

When used in connection with a modular sign, the protocol of the present invention can be used to coordinate displaying a message by allowing each of a plurality of control units to display a desired character to form a message on the array of control units. This sign can be remotely controlled by a pager system. Each control unit includes a box housing a Mylar scroll operated by a motor and employing an optical sensor to read markings on the Mylar scroll to position appropriate characters in response to a signal to display a character to form a part of a message on the modular sign. The box includes an open face with a frame therearound which is a black opaque color. A transparent cover sits thereover to seal up the control unit. The control units are positioned side by side to form an array. The control units can be removed and serviced and/or replaced by means of extraction tools.

The control units are mounted against a wall or within an enclosure by means of connecting brackets having attachment means on upper and lower ends thereof, and include a plurality of contacts formed within receptacles positioned along the brackets to receive spades extending from the back of the control units. Accordingly, the mounting brackets provide electrical contacts as well as mechanical attachment for the control units. The control units include circuit boards in communication with the spades having a reverse bus formed on the circuit board to run power and data along the system, the mounting brackets serving to provide electrical communication between the units and to support the units in an array.

BRIEF DESCRIPTION OF THE DRAWINGS

Other important objects and features of the invention will be apparent from the following Detailed Description of the Invention taken in connection with the accompanying drawings in which:

FIG. 22 is parts list of the components of the circuit diagram shown in FIG. 21.

DETAILED DESCRIPTION OF THE INVENTION

Figure 1A:
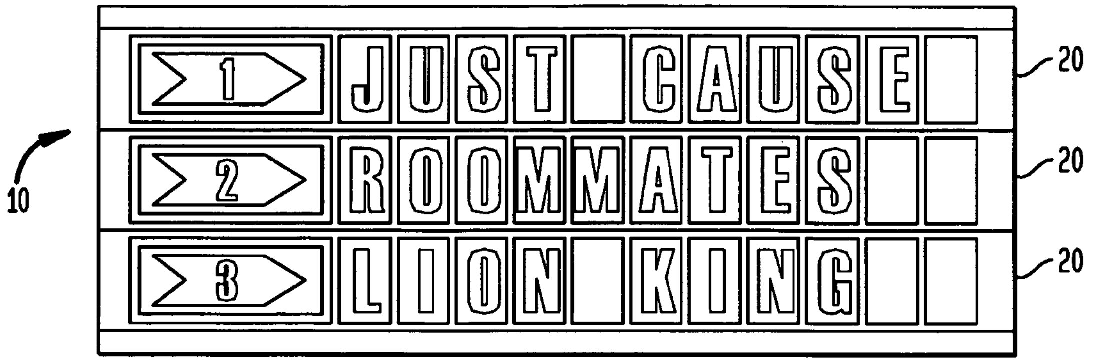
FIGS. 1*a* and 1*b* are front plan views of a modular sign of the present invention.
Figure 1B:
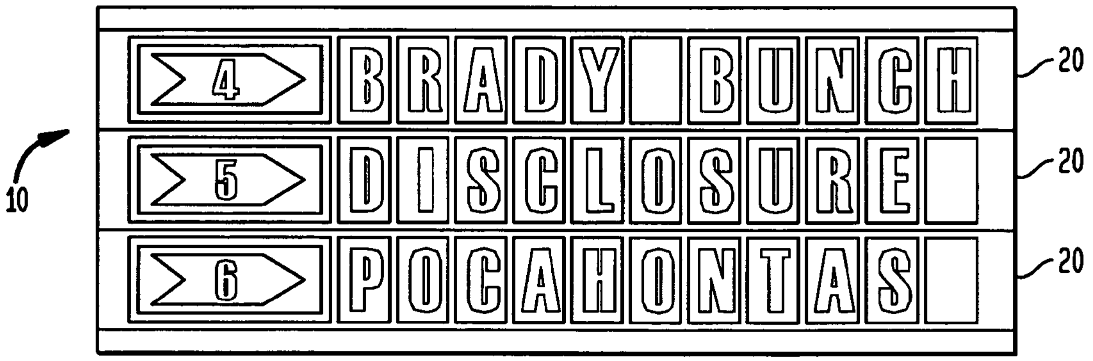

Referring to FIGS. 1*a* and 1*b*, a front plan view of the sign 10 of the present invention is shown with a first message in FIG. 1*a* and a different changed message in FIG. 1*b*. The sign includes a plurality of control units or modules 20 arranged along side each other to form the sign. Each control unit or module 20 is capable of displaying a desired character such as a number or letter so that the sign 10 can display a desired message. The control units can also be placed sideways as shown.

Figure 2:
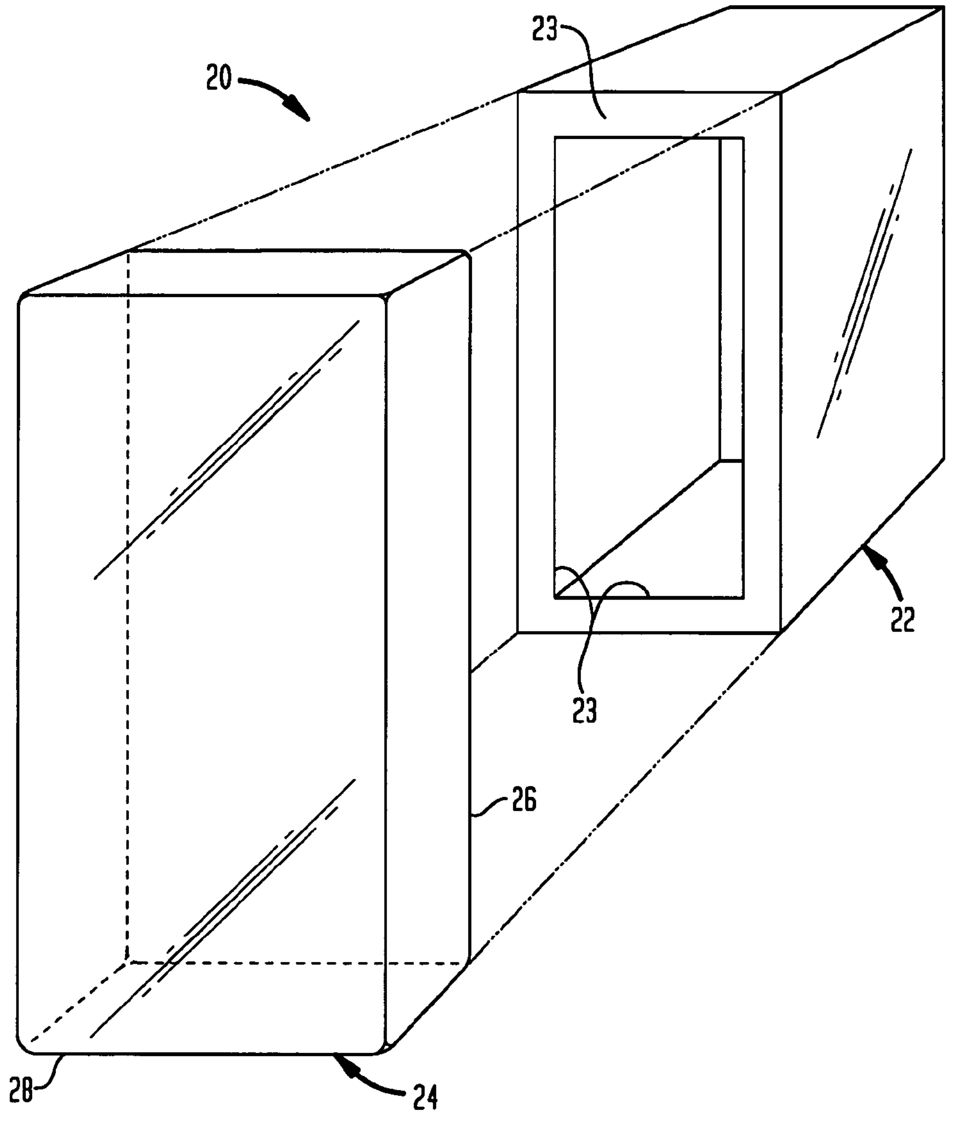
FIG. 2 is a perspective view of a single control unit or module of the present invention.

Referring to FIG. 2, each control unit 20 comprises a box-like enclosure 22 with a cover 24 that fits thereon and snaps thereover. To retain the cover 24 in place on the box enclosure 22, a cooperating protrusion formed on the box 22 can coact with a recess formed within the side wall 26 of the cover 24 to retain the cover 24 on the box 22. Preferably, the box 22 is a black opaque color and the face 28 of the cover 24 is transparent. The box 22 preferably includes a front frame 23 which is also an opaque black color to frame out the display area therewithin which is covered by the cover 24. By forming the frame 23 on the box 22, the advantage of a uniform color match is obtained which may not be obtained if the frame was painted on to the cover 24. Additionally, the frame eliminates the cost associated with painting the cover, and this construction allows the box 22 to be formed of a different material from the cover 24.

The construction of the control unit 20 allows for large surface signs formed from a plurality of units 22 to be flat, water-tight, able to expand and contract over irregular surfaces, and still be pleasing to the eye. Additionally, the overall affect of a plurality of control units 20 grouped together forms a sign of an aesthetically pleasing appearance without the need for fasteners and seems required with conventional sign faces. Additionally, this modular sign is vandal-proof because there are no exposed fasteners or edges to grip without the aid of an extraction tool.

Figure 3:
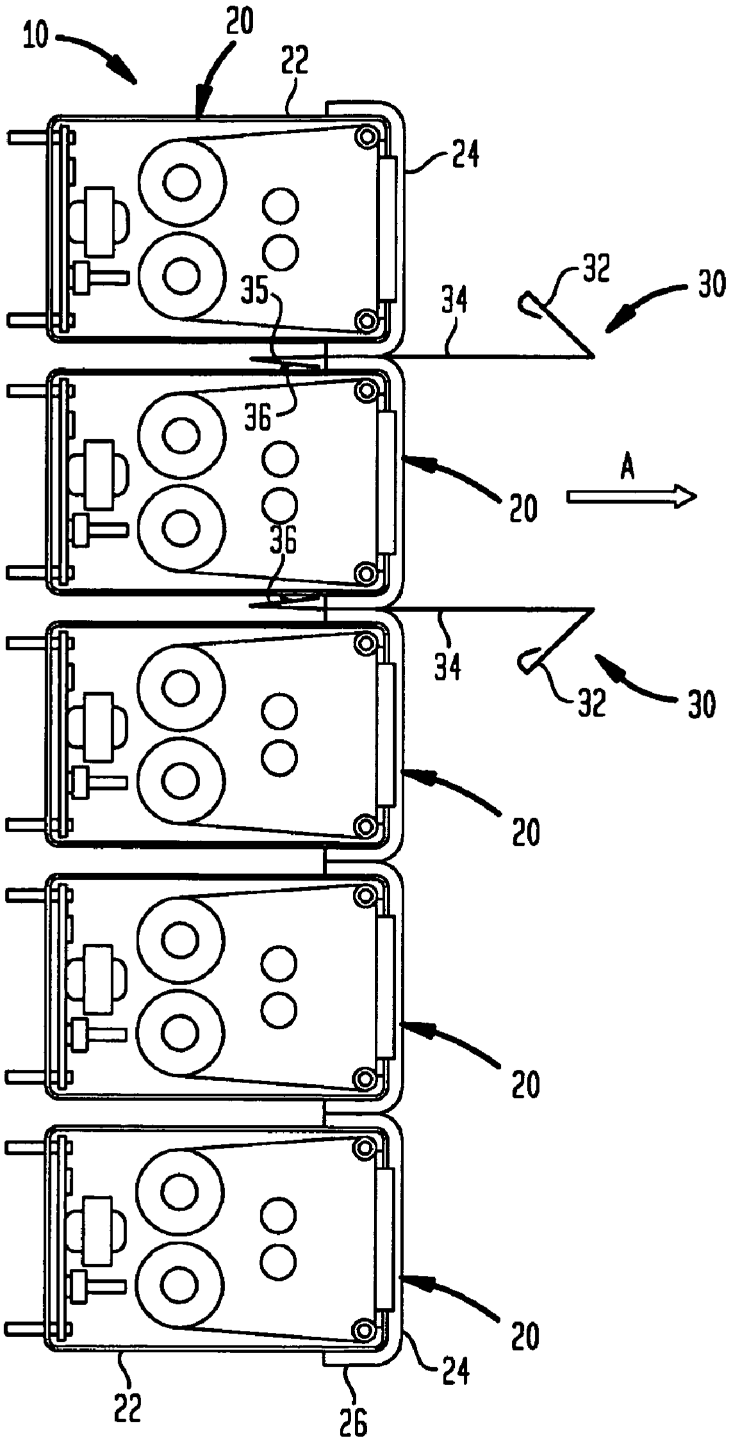
FIG. 3 is a top view of a plurality of control units arranged together to form an array for displaying a message in the form of a sign, and also shows extraction tools for removing control units from the array.

Referring to FIG. 3, a sign 10 is shown having a plurality of modules 20 each of which are arranged along side each other to form a modular sign. Each control unit includes a box 22 and a cover 24. The boxes 22 are mounted in a side by side relationship by mounting means which will be hereinafter discussed. Once installed, a module 20 cannot be easily removed as there is no area to grab on to the box 20.

Extraction tools 30 may be used to extract a module 20 from a sign 10. The extraction tools comprise a grip means 32, an insertion portion 34, and an engagement portion 36 which is bent back against the insertion portion 34 to form a small angle between the insertion portion 34 and the engagement portion 36, which ends in a point 35. Accordingly, in order to extract a module 20 from a sign 10, two extraction tools 30 are inserted along the sides the module 20 to be removed by gripping the insertion tool 30 by the grip means 32, inserting the insertion portion 34 and the engagement portion 36 along sides the module 20 to be removed to insert the point 35 and the engagement portion 36 past a lip formed by the side wall 26 of the cover 24. Once the engagement portion 36 bypasses the side wall 26 of the cover 24, the engagement portion 36 is naturally biased to spring away from the insertion portion 36 to align with the lip formed by the side wall 26 of the cover 24. The engagement portion 36 engages the lip of the side wall 26 of the cover 24 and then one can pull the extraction tool 30 by the grip means 32 to pull the module 20 away from the mounting means in the direction of arrow A to remove the module 20 from the sign 10.

The construction of the modular sign 10 of the present invention permits a sign to be constructed that is serviceable from the front with no external cover plates which can buckle and which need to be seamed together. This allows retrofitting of existing boxes to make aesthetically pleasing signs of 30 feet or more in size with a commercially appealing look. Without the covers 24, there would have to be secondary water tight cover plates with seals and gaskets to encompass the entire sign. Of course, such a construction is also within the scope of the present invention. Service panels would have to be provided on the rear of the sign making retrofitting of existing signs possible.

Figure 4:
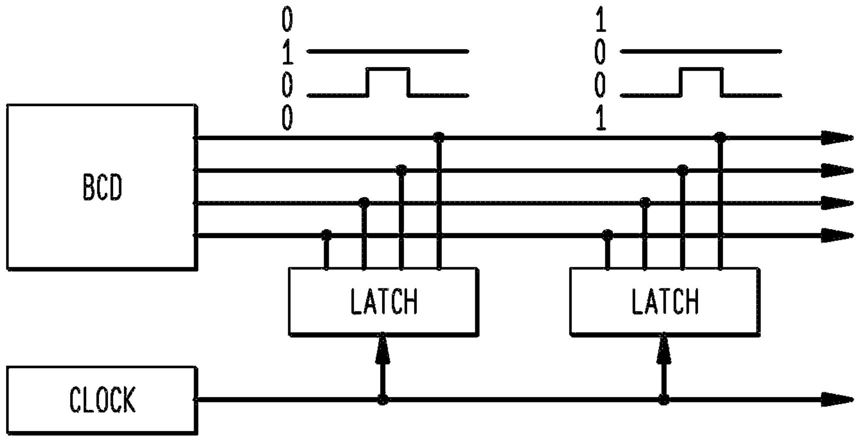
FIG. 4 is a circuit diagram of a parallel shift register which can be used address control units in the present invention.

The present invention includes a method and apparatus for addressing and identifying the control units comprising a system based on a self-addressing protocol. This protocol can be implemented in a number of different ways. As shown in FIG. 4, a parallel wire bus with a BCD code using four wires in parallel and one wire as a clock pulse to set a four bit latch to trap the data sequentially can be used. This method is known as a paralleled shift register and is used to trap data in memory boards on computers. What is different in the present system is that many separate circuit boards, each one located in a separate control unit or module, runs different applications and the data must be shifted along the wires two bits at a time to allow each unit to trap its data.

Figure 5:
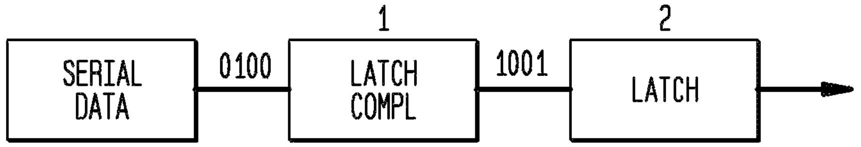
(PRIOR ART) FIG. 5
FIG. 5 is another embodiment of a circuit for addressing control units of the present invention.

FIG. 5 is a circuit diagram showing a system having a reduced amount of wires to send data and simplify the board latching design by using a micro controller to reduce the transmission lines to two lines. In this embodiment, data is sent by sequential shifting and the data is received through one or more trappings of data one bit at a time. This reduces the speed of this system, and because of the sequential nature of the system, if one unit goes down, the system cannot work.

Figure 6:
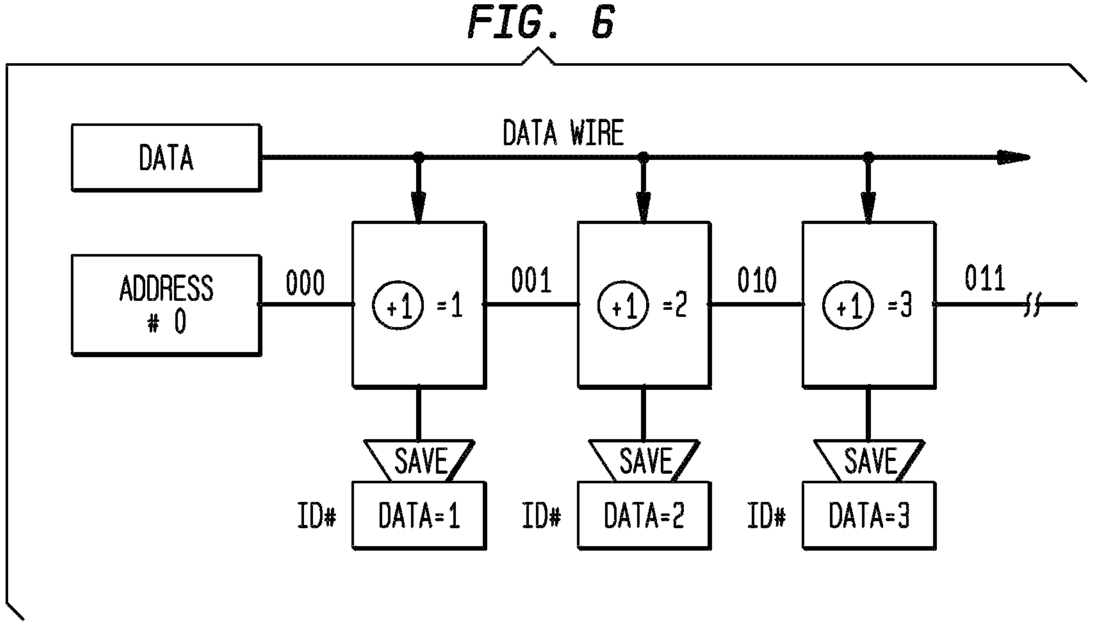
(PRIOR ART) FIG. 6
FIG. 6 is another embodiment of a circuit for addressing control units of the present invention.

FIG. 6 shows another embodiment of a circuit for addressing control units wherein two or three wires are used to control the units and the data flow to the units. In this system each of the control units self-addresses itself upon system startup. This is accomplished by each unit checking its ID number by looking at the ID number of the unit in front of it and adding a one to that number and storing that number in a permanent non-volatile memory establishing its ID. This happens down the line and accordingly, an infinite amount of sequential control units can self-identify themselves in the system.

When the unit knows its ID number it watches the main broadcast wire or fiber optic link or radio link or other communication means for its ID number. When it sees its ID number, it reads the block of data that follows it and traps that data. Accordingly, all of the units constantly look at the broadcast line to obtain data. If any of the control units should fail, the remainder of the units are able to function independent of the failed unit. Additionally, a failed unit can be replaced by any other operable unit, even one already in the system with another assigned number, and the replacement unit will appropriately address itself and will be active in the system. In this way a system of many control units or parallel computers is created, which units self-address and are able to look to a broadcast line to trap relevant data directed to each of the units, and the units can each perform a task as a collective unit. This system comprising a plurality of control units or parallel computers may be serviced by a person having no knowledge of the system by merely replacing failed units. The failed units then re-address themselves and function as part of the system. If that unit fails, the rest of the system still continues to function.

Figure 7:
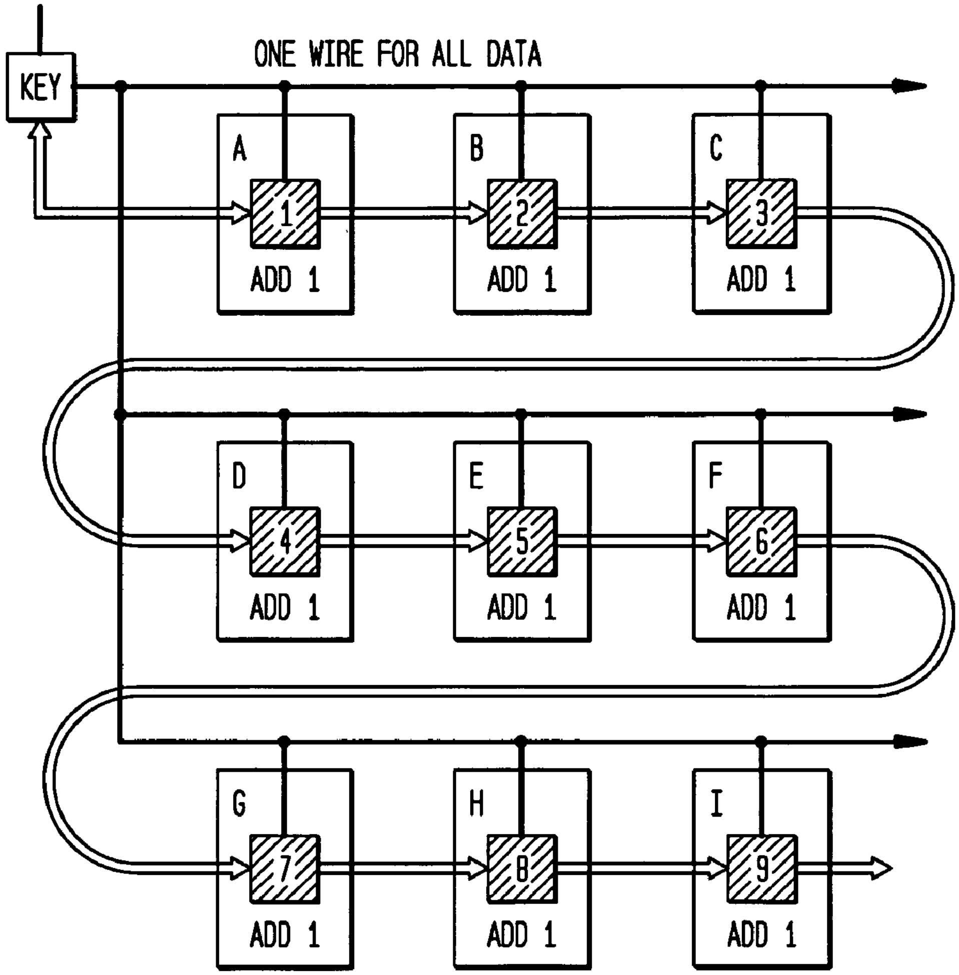
FIG. 7 is an alternative view of a system shown in the circuit diagram of FIG. 6.

FIG. 7 is a alternative view of the system depicted in FIG. 6. As can be seen in FIG. 7, a key or master control units sends data along a wire. Meanwhile, the key sends out a signal to the first unit to address itself as unit 1. Thereafter, the second unit addresses itself as two by seeing the first and adding a one thereto. This is continued down the line so that each unit self-addresses itself. Further, it should be pointed out that the units can be addressed in a single sequence or each row can be separately addressed: Row 1 comprising Unit 1,1; 1,2; 1,3; etc., and Row 2 comprising Unit 2,1; 2,2; 2,3; etc.

Figure 8:
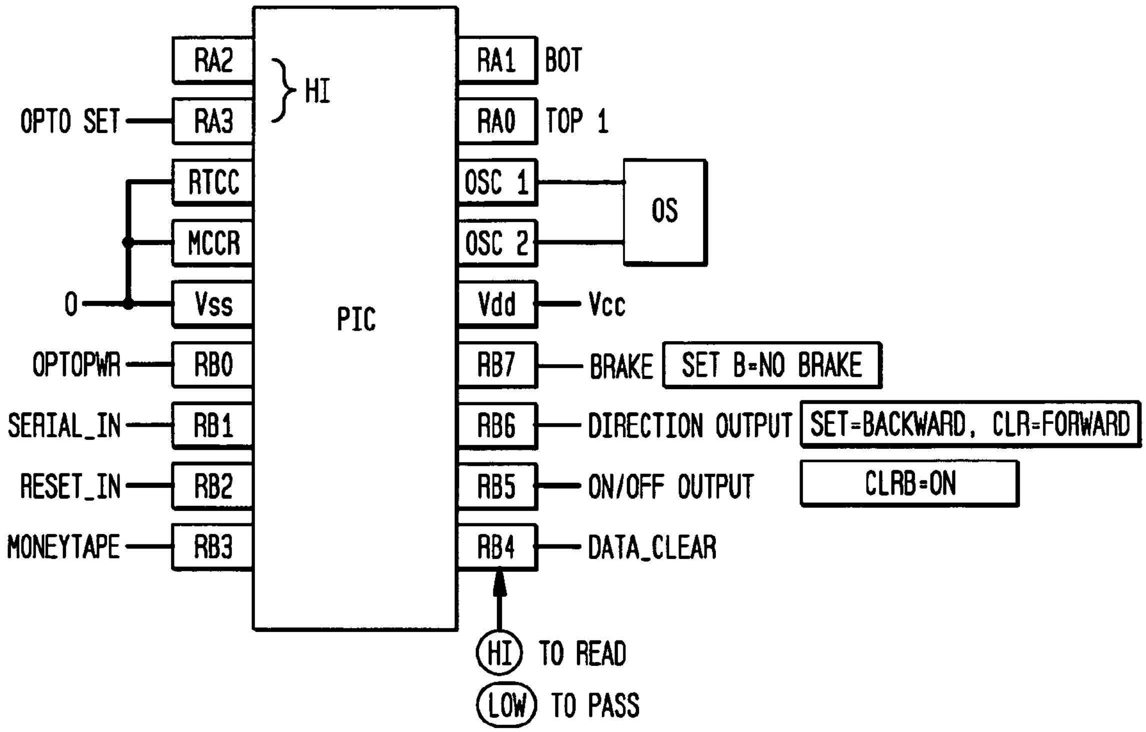
FIG. 8 is a chip input/output configuration for a chip used for the system shown in FIGS. 6 and 7.

FIG. 8 shows a diagram of a chip input/output configuration for a chip to be used with the system shown in FIGS. 6 and 7.

Figure 9:
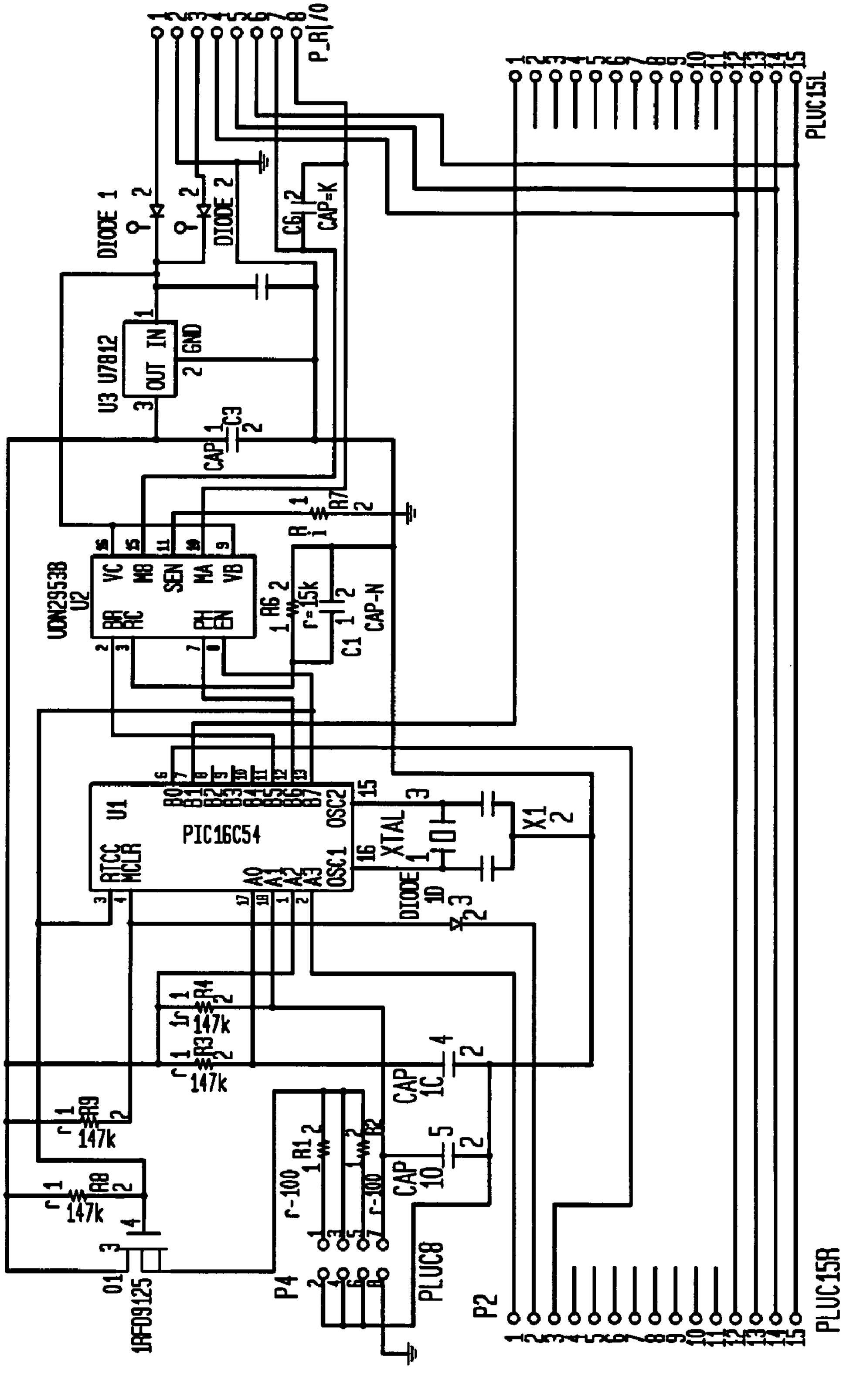
FIG. 9 is an actual working schematic circuit diagram of the circuit for use and connection with the system of FIG. 5.

FIG. 9 is an actual working schematic circuit diagram for use in connection with the system shown in FIG. 5.

Figure 10:
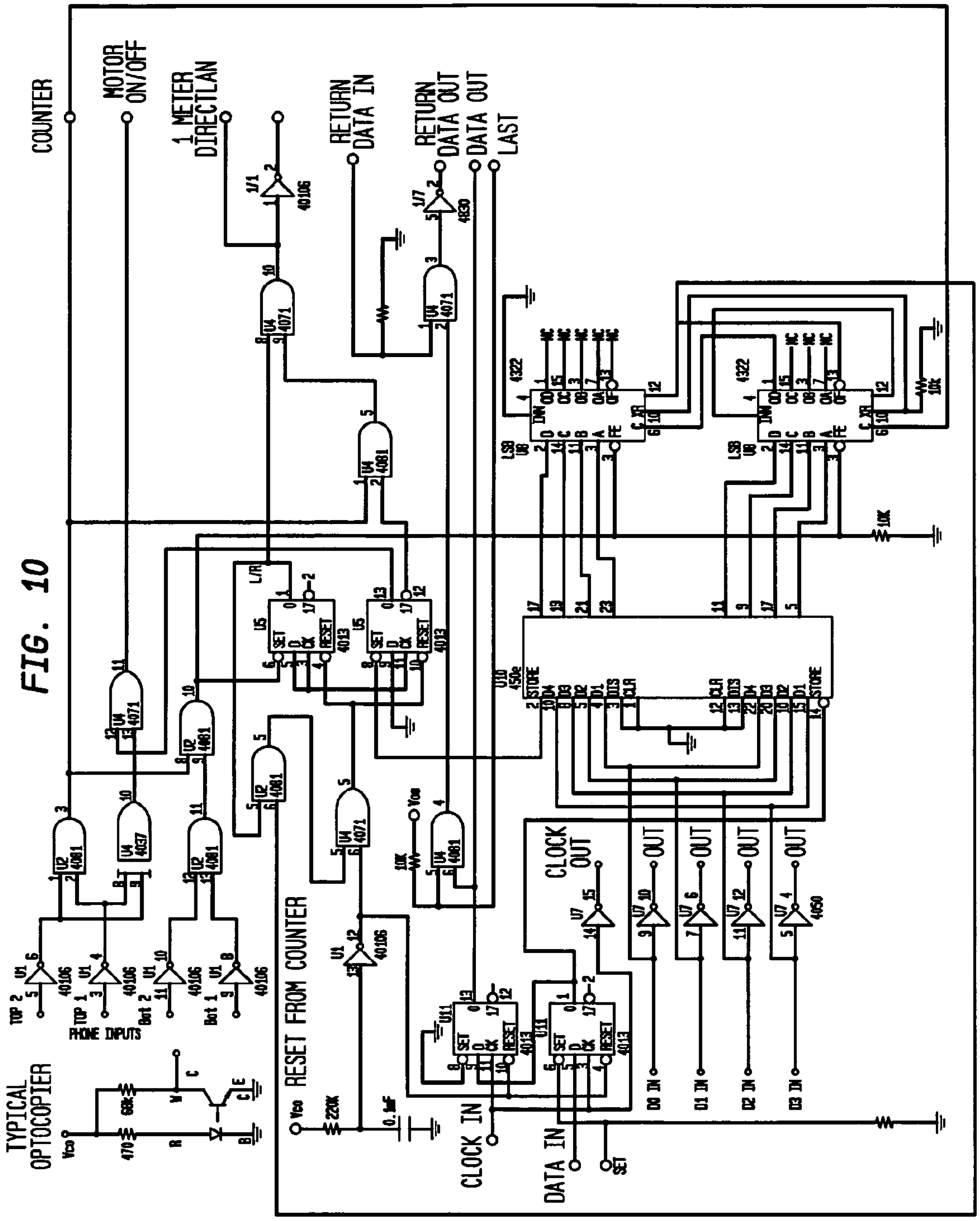
FIG. 10 is an actual working schematic circuit diagram of the circuit for use in connection with the system of FIG. 4.

FIG. 10 shows an actual working schematic circuit diagram for use in connection with the system shown in FIG. 4.

Figure 11:
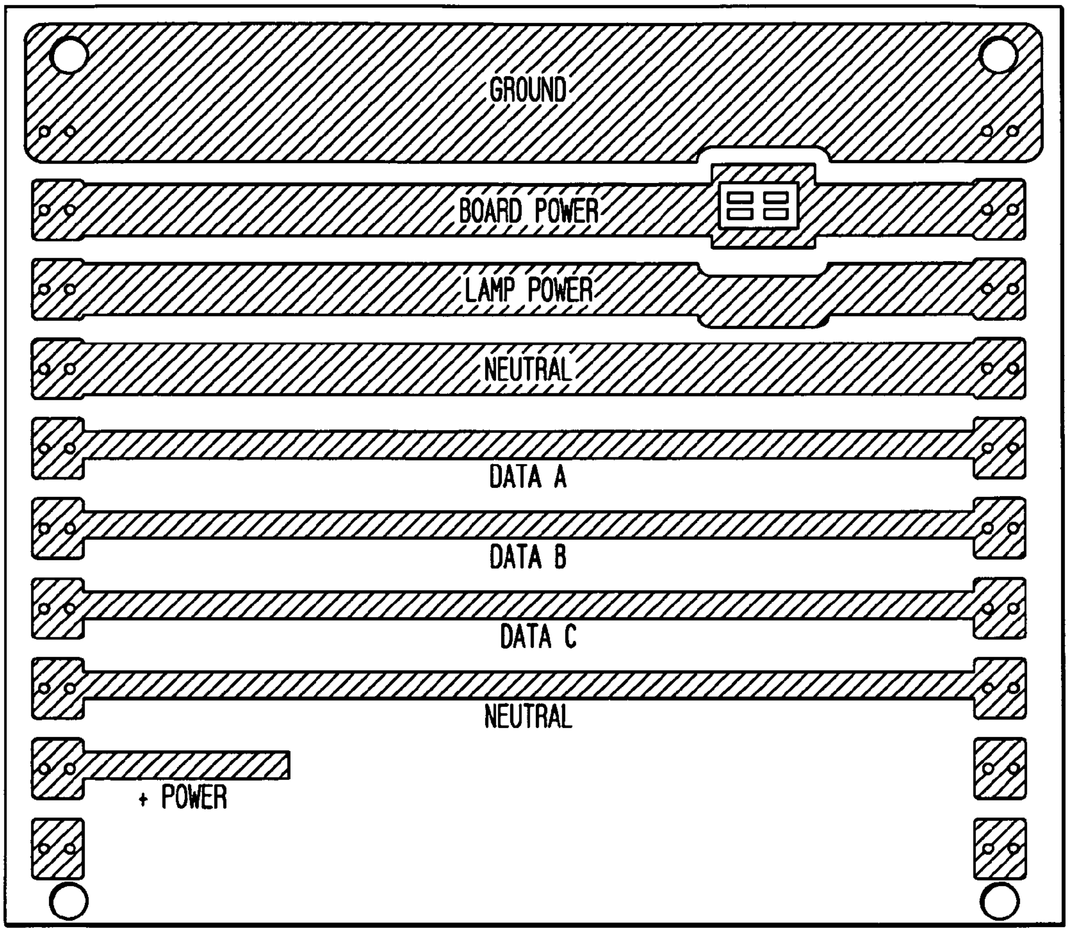
FIG. 11 is a bus diagram for use in connection with the reverse bus system for the system of FIGS. 6 and 7 of the present invention.

FIG. 11 shows a bus configuration for the systems of FIGS. 6 and 7.

Figure 12:
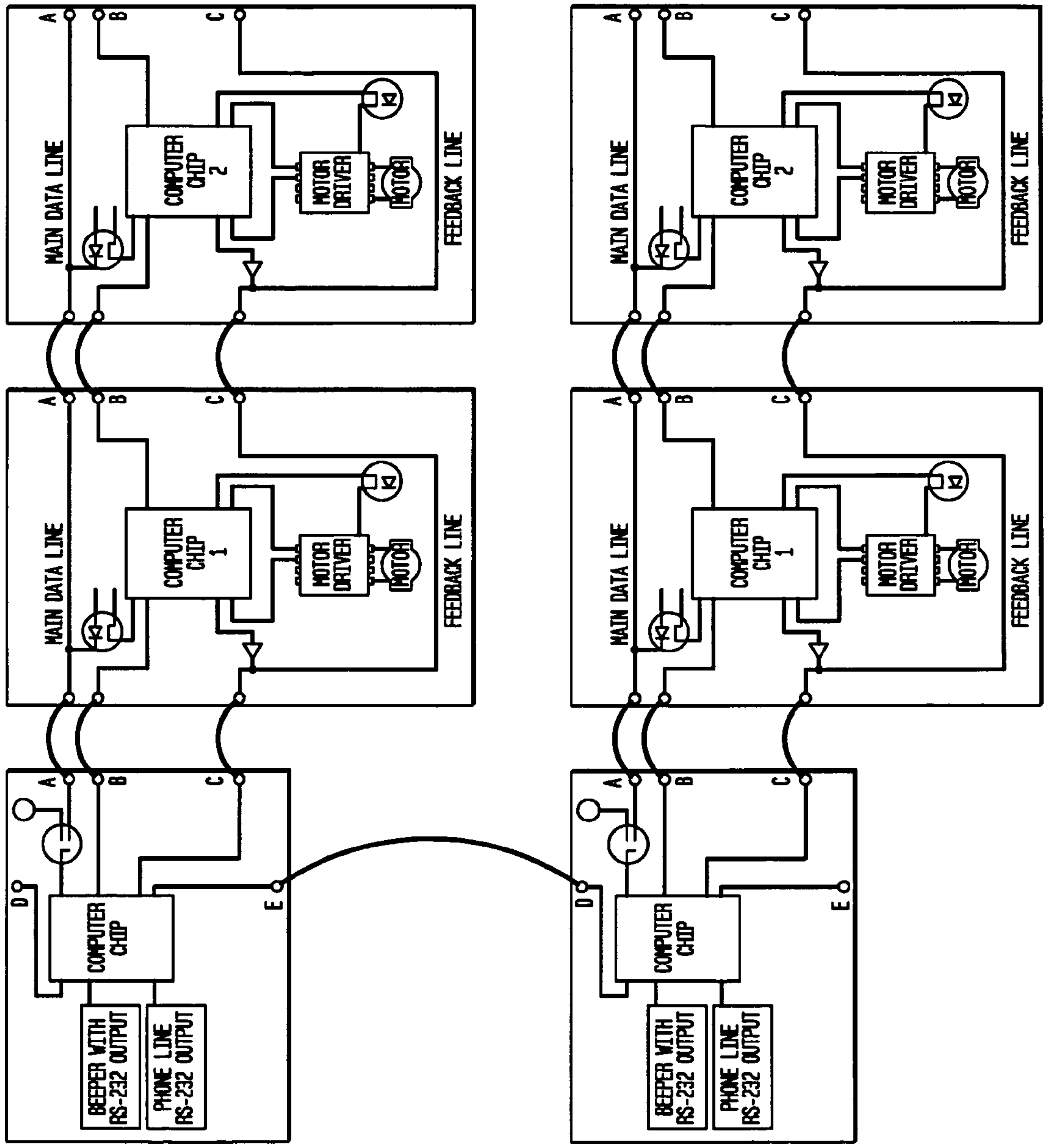
FIG. 12 is a block diagram of the theory of operation showing the circuit boards of a plurality of controllers and control units interconnected together.

FIG. 12 is a block diagram of theory of operation showing two rows having two columns of a circuit and chips for running the system shown in FIG. 7. Note that each row has a key having a computer chip, a beeper with RS-232 output and/or a phone line with RS-232 output interconnected with the computer chip as well as a power source interconnected with a computer chip and lines leading from the key along the column to contact a first control unit where the power supply is brought to the first unit and a line for the chip ID is interconnected with the control unit. Additionally, there is a link to the control unit for providing a feed back line and there is a link from a one controller for a first row to a second controller at a second row. Alternatively, there could be one controller controlling all of the columns and rows. Each control unit includes a computer chip which ties into the chip ID line coming from the key and that extends out to a subsequent chip ID which would again interconnect with a subsequent control unit. Additionally, the power source brought in from the controller is run in to the control unit and used to power the control chip and then is brought through the control unit to subsequent control units. The computer chip is further interconnected logically with a motor driver and a motor which mechanically interconnected with a Mylar-type scroll mechanism having a plurality of characters thereon which can be moved to position a desired character at a desired location. Additionally, the computer chip is interconnected with a photo sensor for identifying a bar code or other identification means associated with the Mylar-typed scroll to properly position the desired character at a desired location by reading the bar code off the Mylar-type scroll. Finally, the computer chip is also interconnected into the feedback line to communicate with the prior control unit or ultimately the main controller. The subsequent control units are interconnected with previous control units in the same way and subsequent rows are interconnected with additional controllers or the main controller.

Each box includes a transformer to avoid custom switching supplies. In the key module, each one needs a power supply as big as it is because the motor draws the most amount of power, but for broadcasting the motor is not running the units steal power from the first module and do not need to have a power supply.

Figure 13A:
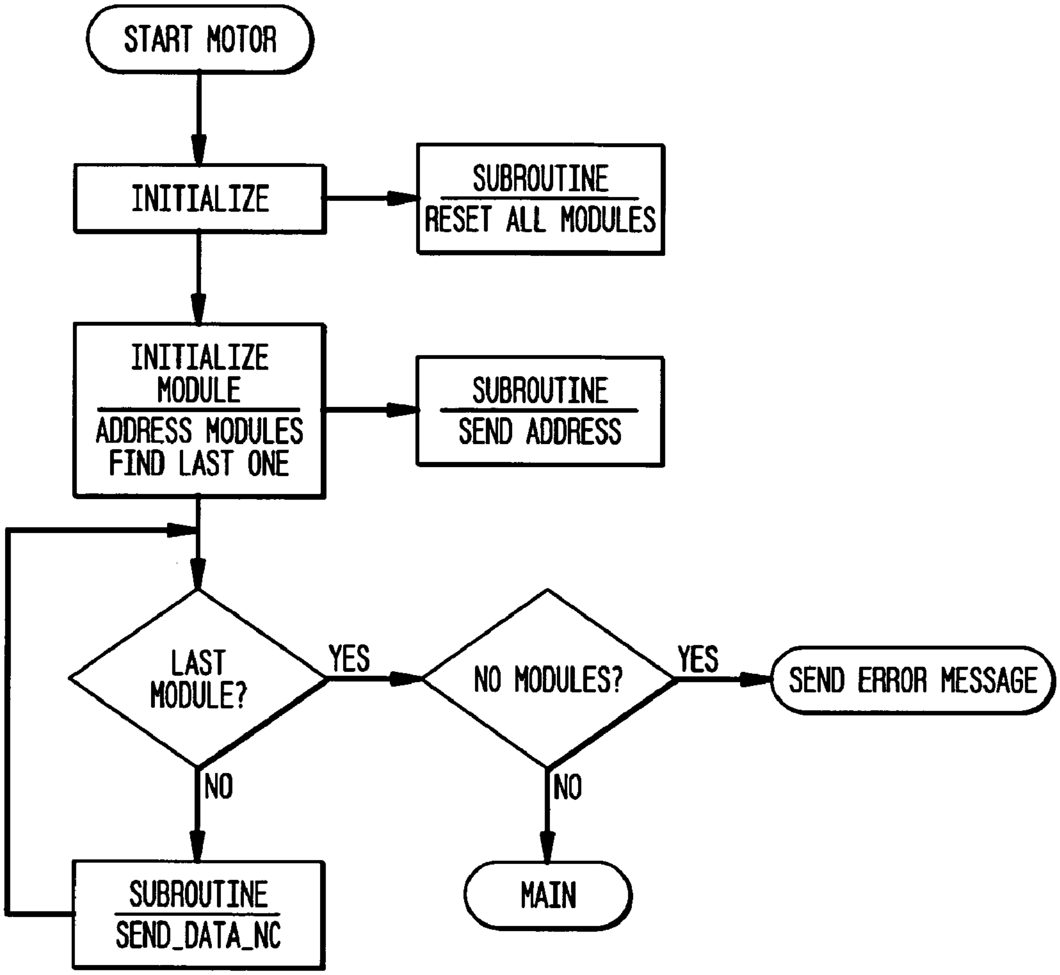
FIG. 13*a*, b, and c show a logic flow chart of the system of FIGS. 6 and 7.
Figure 13B:
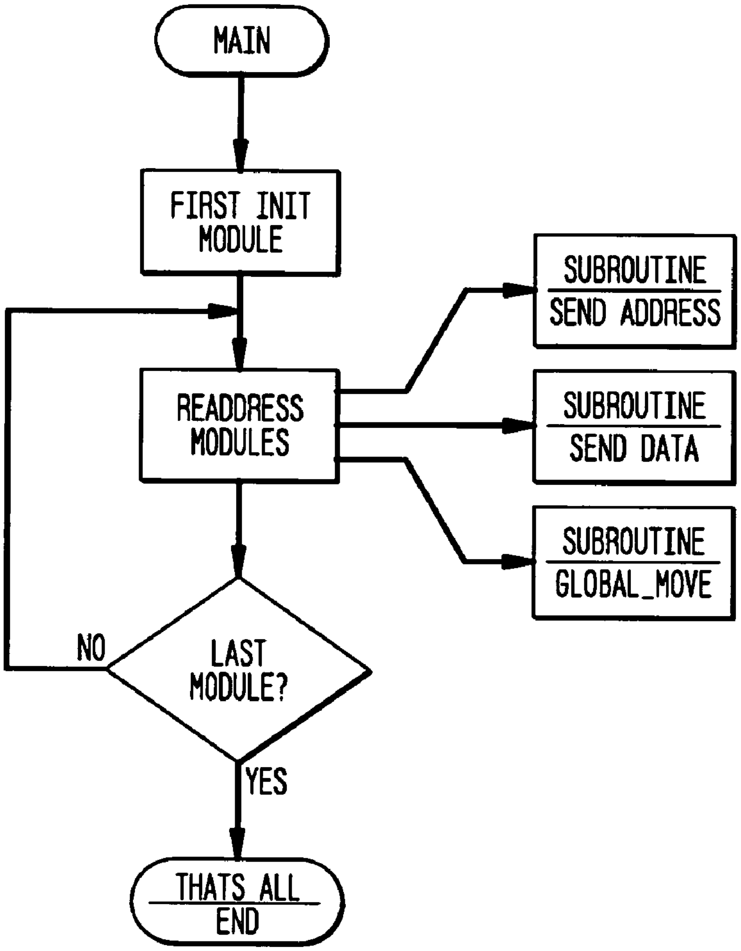
Figure 13C:
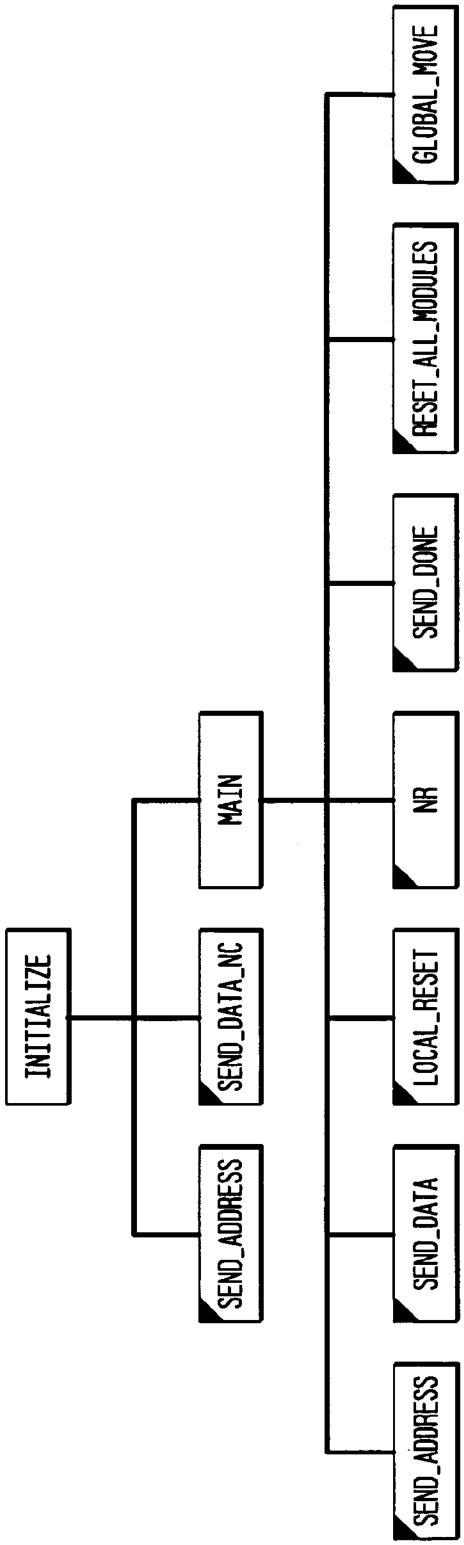

FIG. 13 shows a logic flow chart for a control of each box from power-on for system of FIG. 6. Initially, the system must go through a setup sequence. The first thing the computer needs to know is if it already knows its ID number. If it knows it, it jumps right down into "Do I know where I move to." If it doesn't know it, then it is going to look to its key module to center itself with the module back and forth, find the bar code, come back in there and look for its address and set the address at $E^2$ which is non-volatile memory, or Electronic Erasable Memory. Then it turns the left control on, then turns the motor on, then it reads the photo cell to see if there is black. If there is black, then it sets the time. If it is not black, then it turns the motor on to move it to a white position. Then it turns the motor back to the right and it says where I am. Anotherwords, it takes the Mylar and moves it to the very beginning of the row. It will see black, white, black, black, white. It looks for that real long black mark and then it creeps back to where the edge is and says OK. If it already knows where it is, then it does not move the module. Then it looks for the address. If it knows where it is at, then all it does is it looks to see whether or not compare where it is with the new data. The new data comes in an $E^2$ code in front of it. Then it is waits until it gets some new data in. When it gets the new data in, it takes the new data and moves the Mylar appropriately to get to the new spot. Once it sets the direction, then it turns the motor on because the direction is one wire and the on/off is another wire. It is going to look for the black, set the time, and look for black again. Now the reason why there are multiple blacks in here is because the first black if it looks for black it needs to see that black in for a certain amount of time because it could be a scratch and it is called debouncing. So it goes through a loop and looks further for black. If it sees black but then doesn't see black again, it thinks that the black was just a false black, it is not long enough to be a code, ignore it, and goes back for a loop. Once it finds the black, then it measures the black to see if the black is less than a certain amount, that tells that it is a small one. If it is longer than the amount, then that tells it is the long black mark because there is a long black mark and a short black mark. Once it checks that it does count a number and gets an address number, is the number short, is it out, check for odd and even and if it is bad, add one to the count and send it back. If it is good, ignore it, check the data and the count, latch the data, permanently store it, and then tell the computer in $E^2$ memory.

A copy of a computer program for running the circuitry of FIG. 5 is attached hereto as appendix A.

Importantly, the protocol comprising a plurality of modules wherein each of the modules comprises a separate discreet mechanism which operates in unison with the other modules to create a system. Importantly, each of the modules is self-addressing is self-identifying and accordingly, the system has a high degree of survivability and is easily maintained and fixed. The system of the present invention has applicability to modular signs as discussed herein as well as applicability to computer network systems wherein a plurality of computers are placed on a network and each computer has to be identified in order to properly communicate and interact with the main controller as well as with the other computers. Following the protocol of the present invention, each computer would self-address itself and accordingly, be replaceable with any of the other modules to continue to properly work. The protocol of the present invention has further utility in application to a prosthetic type device which involves a plurality of modules for communicating information and taking specific action.

For example, a prosthetic device comprising a hand, in a simplified form, could comprise six different modules, one for each finger, and one for the palm and one for wrist and one for arm. Each of these modules would be self-addressing and accordingly, the thumb could identify itself as number 1, the index finger is number 2, the middle finger is number 3, etc. Thereafter, each of the modules watches the information line for information relating to the particular module. For example, the index finger monitors the information bus for a signal identifying module 2. If such a signal comes through to module 2, module 2 then looks for the subsequent information or data which describes the action that it should take. Accordingly, for finger number 2 to move, it looks for its identification number and then for data which tells it to move and upon receiving that data it appropriately moves. In the system, should the hand or thumb fail, the index finger can still operate independently through software that allows it to still work in a limp mode albeit less efficiently because it sees all the data. Additionally, if the thumb is replaced, it addresses itself and becomes part of the system without the protocol thereto.

Figure 14:
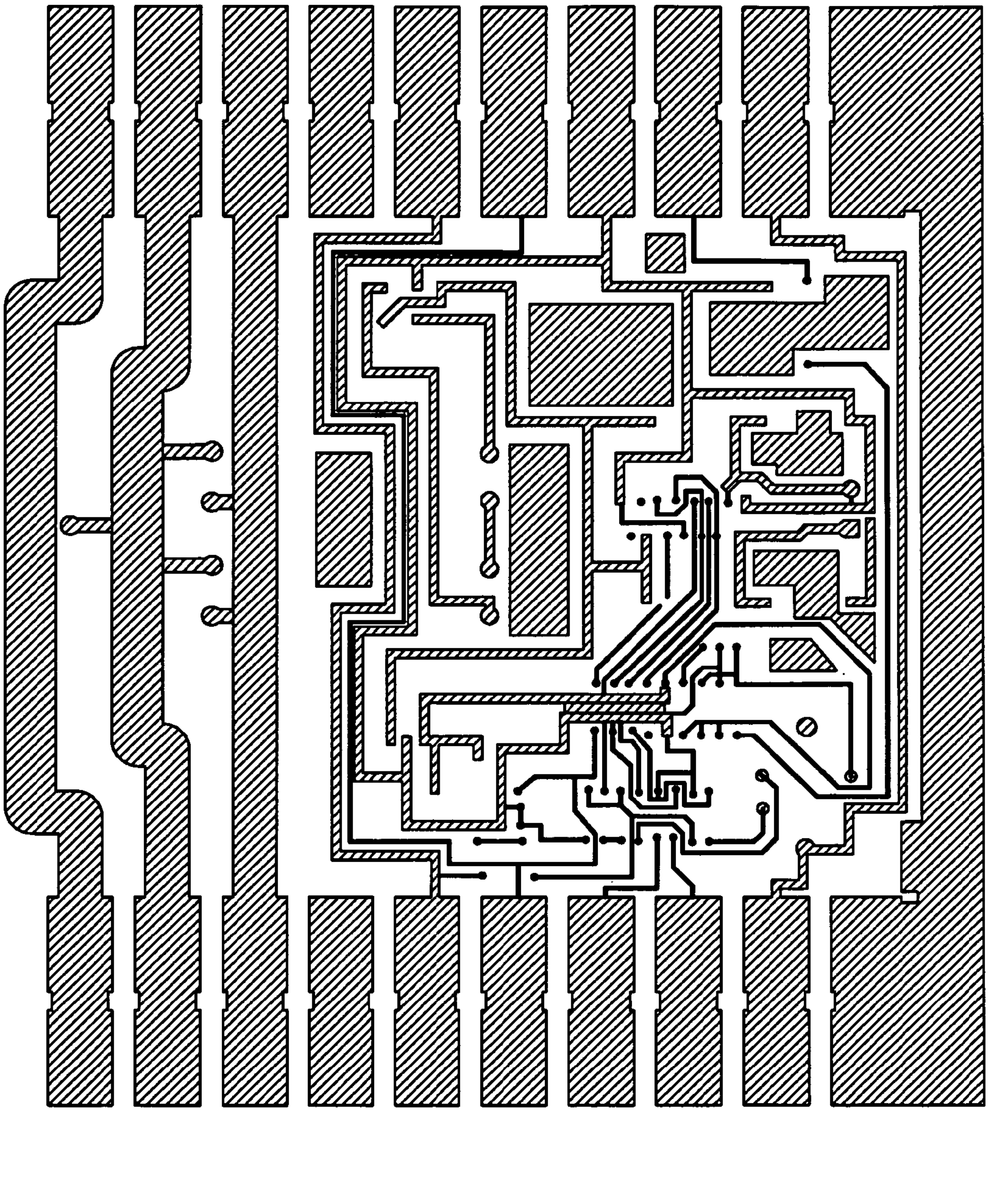
FIG. 14 shows a circuit diagram for the circuit boards for the system shown in FIG. 6.

FIG. 14 shows a circuit board included in the control units of the present invention.

Figure 15:
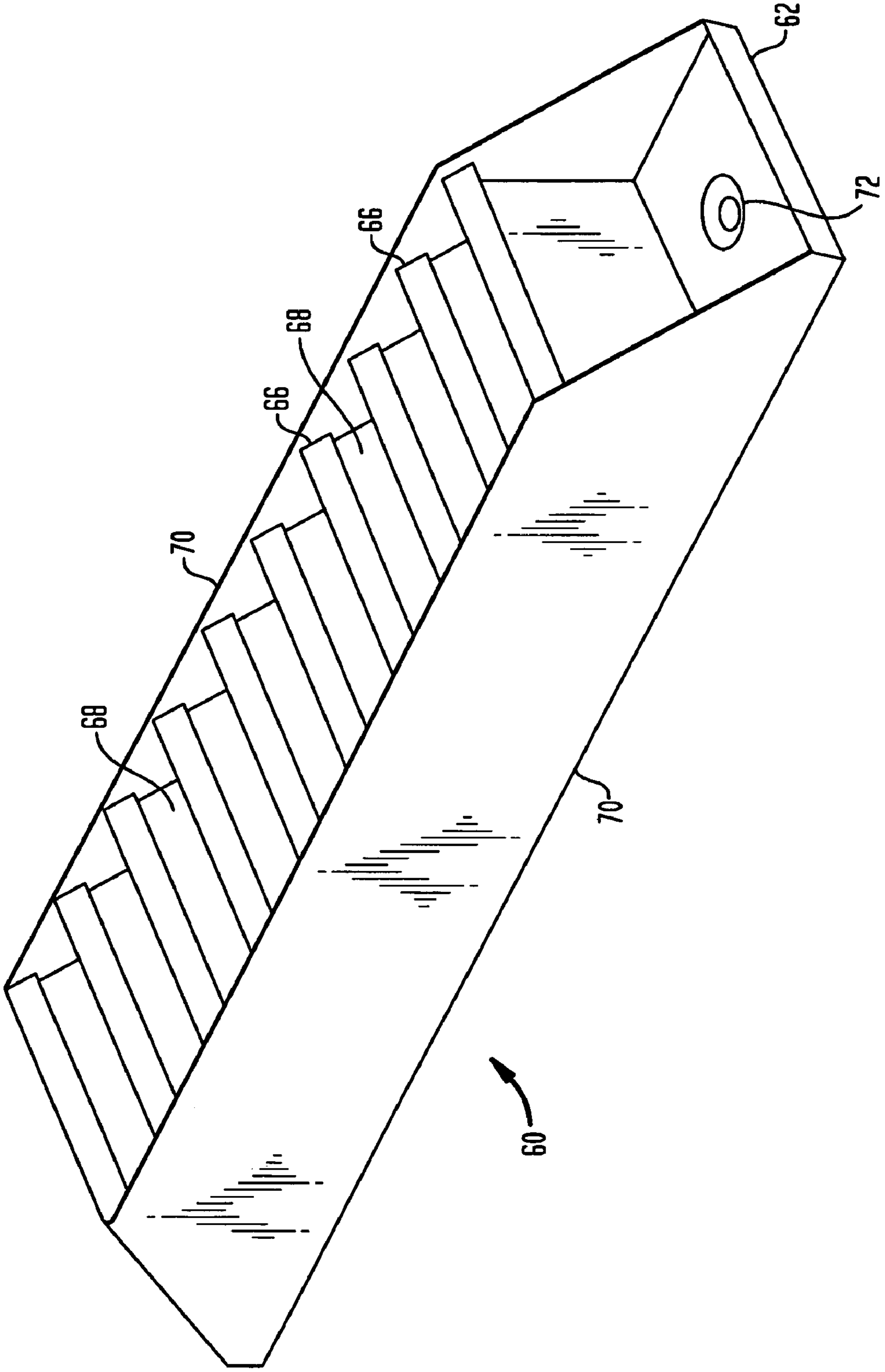
FIG. 15 is a perspective view of the connector used to mount the control units of the present invention.

FIG. 15 is a perspective view of the connector 60 used to mount the control units of the present invention.

Figure 16A:
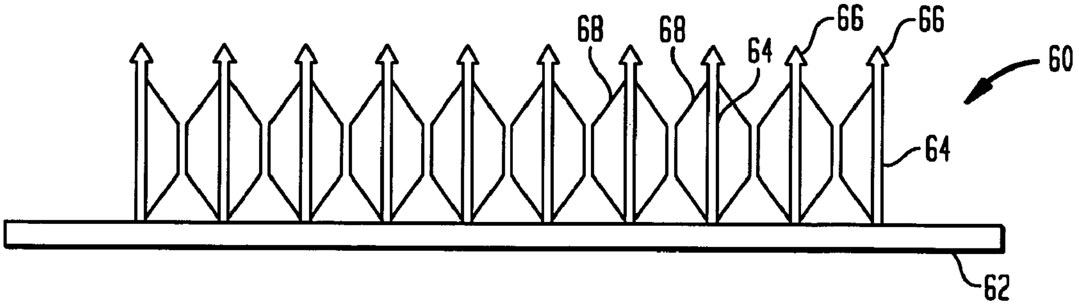
FIG. 16*a* shows a side view of the arrangement of the electrical and mechanical contacts within the channels formed within the period.

FIG. 16*a* shows a side view of the arrangement of the electrical and mechanical contacts within the channels formed within the period. Accordingly, the connector 60 includes the a base 62, a plurality of upstanding wall 64 interconnected with the base and extending perpendicular therefrom, retainers 66 positioner at the upper end of the upstanding walls, and electrical contacts 68 positioned within the spaces formed by the upstanding walls and retained within the connector by means of retainer 66. The contacts are preferably gold plated to resist corrosion. The contacts provide mechanical support for the control modules and additionally provide for electrical connection between adjacent control units. The connectors further include side walls 70 to form the connectors into a unit. Additionally, apertures 72 are positioned at upper and lower ends of each connector to facilitate connection of the connector to a wall or enclosure or other location for fixing the connectors thereto.

Figure 16B:
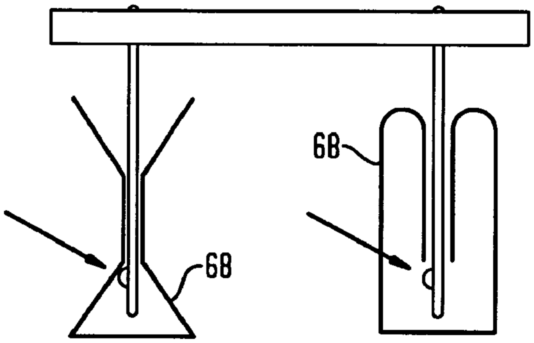
FIGS. 16*b* and 16*c* show other embodiments for the shape of the contacts.
Figure 16C:
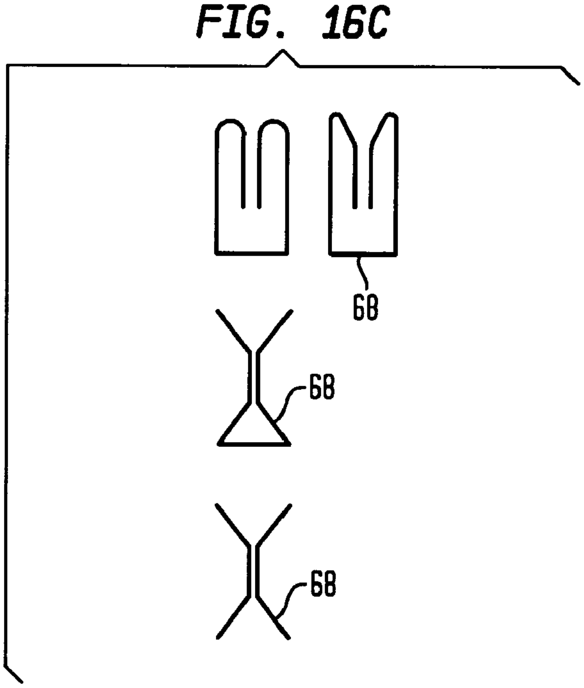
Figure 17:
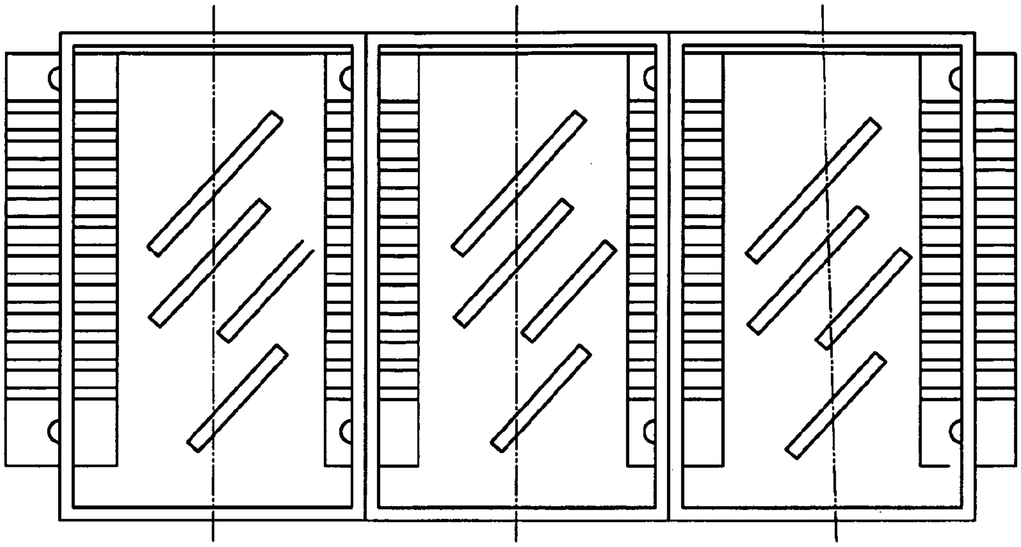
FIGS. 17, 18, 19 and 20 show the connectors attached to a wall to position the connectors at relatively uneven positions along a wall while maintaining even positioning of control units attached thereto.
Figure 18:
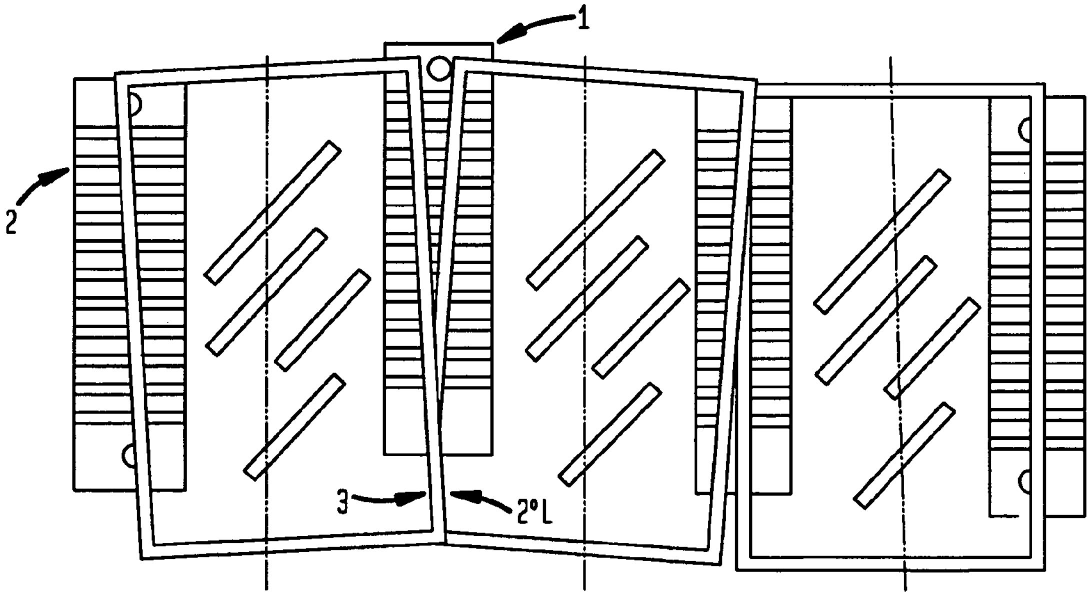
Figure 19:
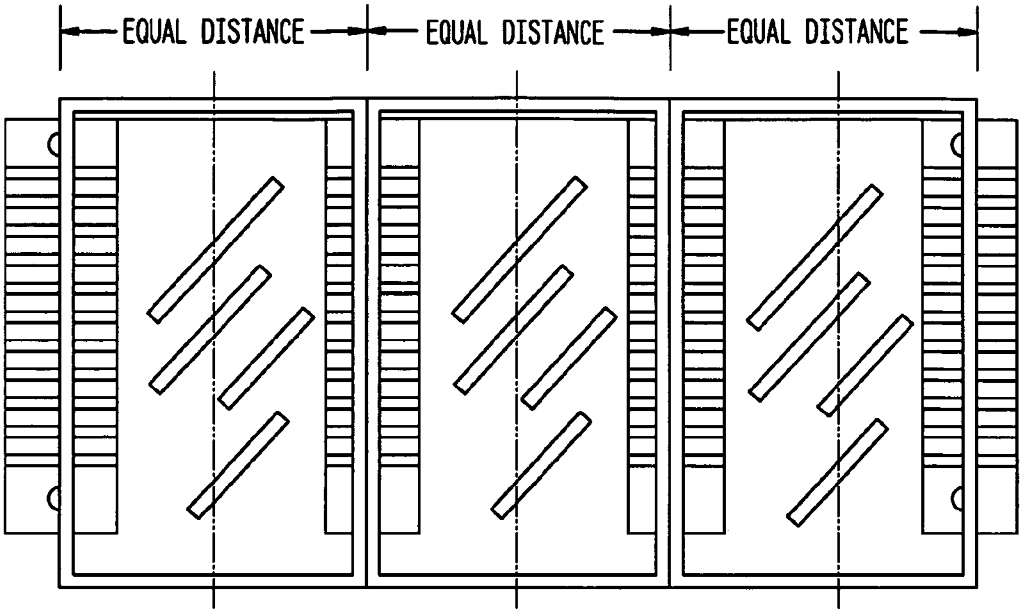
Figure 20:
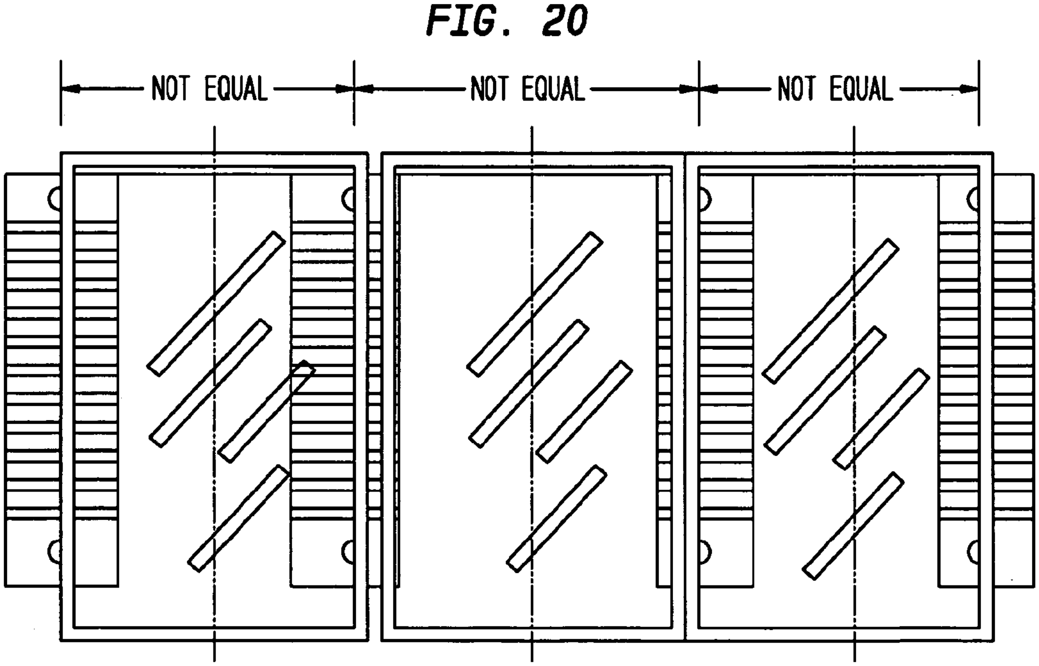

FIGS. 16*b* and 16*c* show other embodiments for the shape of the connector. Also, it should be noted that the connectors and/or the knife contacts from the control units can have a protrusion to retain the interconnection between the knife contacts and the contact 68.

Referring to FIGS. 17, 18, 19 and 20, it can be seen that the connectors are attached to a wall by means of inserting connectors through the apertures to position the connectors at relatively even positions along a substrate. Each control unit can then be mounted on adjacently positioned contact connectors. Each connector is large enough to receive the knife connectors of adjacent control units to provide electric connection therebetween. Additionally, it can be seen from FIGS. 17-20 that the positioning of adjacent connectors does not have to be perfect in order to provide for a uniform appearance of the control units attached thereto. Anotherwords, there is leeway between the positioning of the connectors and the overall appearance of the array of control units connected therewith. The receptacle in the connectors allow for the interconnection of knife contacts from the control modules to tie the control modules together electrically and mechanically. The connectors allow for multiple units to be fastened to a wall or board without any external wiring. The connectors allow high currencies while data passes through an entire array of control units providing the current data evenly to all units without the need for wiring. As much as two inches of latitude is provided allowing for improper installation of the connectors while still making a uniform array of modules to form a uniform looking sign. Further, the size of the connector allows for up to four degrees of canting due to improper installation or due to an irregular wall behind the connectors and allows the modules to still provide a uniform look to the array. The large size of the connector allows for the handling of high occurrence without over heating and maintains compliance with the National Electrical Code. Additionally, the large size allows for a physically sufficient mechanical connection to secure heavy mechanical objects as a final attachment point without the need for external fasteners. Further, the protrusion or dimple that is provided on the male spade or on the contact itself prevents the walking of the control unit out from the connector due to vibrations.

With respect to prosthetics, the individual direct commands that have to go through the hierarchy, but on top of that are generalized global commands. So as well as the self-addressing routing, there are some global commands that all of the units look for which can supersede local commands through separate routines through separate key words. It takes more processing time but because all of the modules are listening to the data line, the path of communication broken.

Figure 21:
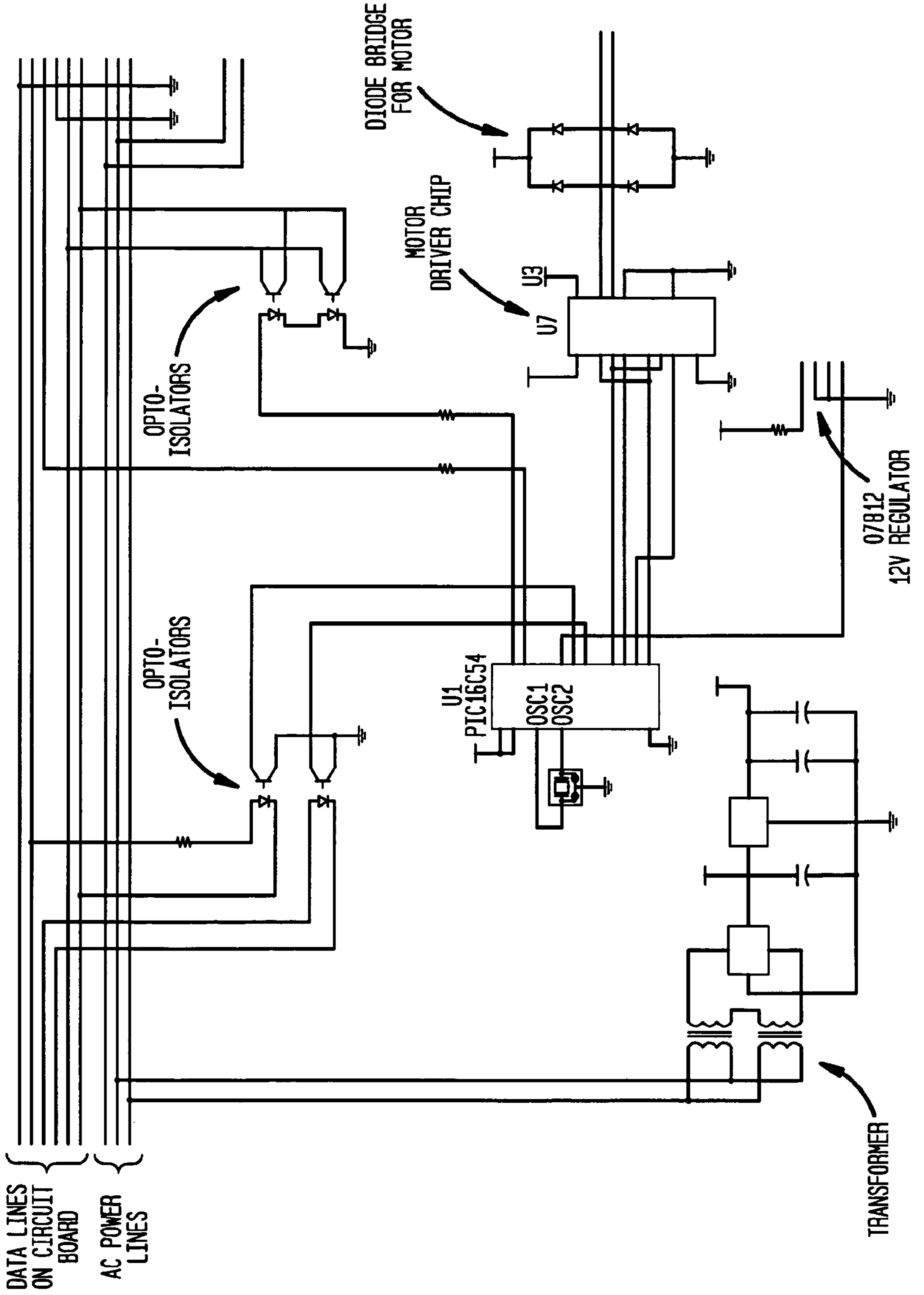
FIG. 21 is a schematic of a circuit for use with the circuit board of FIG. 14.

FIG. 21 is a schematic of a circuit for use with the circuit board of FIG. 14. FIG. 22 is parts list of the components of the circuit diagram shown in FIG. 21. Appendix B is a transmission code for the key module. Appendix C is the actual code for the module itself.

Having thus described the invention in detail, it is to be understood that the forgoing description is not intended to limit the spirit and scope thereof. What is desired to be protected by Letters Patent is set forth in the appended claims.

What is claimed is:

1. A self-addressing control unit system for controlling a sequence of or an array of display signs comprising:

a) a plurality of control units each associated with a portion of the display sign array and all electrically interconnected by a physical or logical parallel electrical bus having multiple connections to transfer data or power between the control units,
   wherein said electrical bus further comprises a main broadcast line, an addressing line and a feedback line to every control unit;

b) a master or remote controller electrically interconnected with the plurality of control units by the electrical bus,
   wherein the master or remote controller transmits an initial address to a first of the plurality of control units on the addressing line of the bus; transmits data on the main broadcast line; and assigns an address to blocks of data, wherein each said assigned address represents the address of the control unit that processes the block of data;

c) a communication device associated with the master or remote controller for communicating a signal to the plurality of control units along the main broadcast line;

d) a receiver within each of the plurality of control units that receives the initial address from an immediately preceding control unit along the addressing line;

e) a calculator or computer within each of the plurality of control units wherein the address for that control unit is computed by performing a mathematical operation that changes the initial address received from the immediately preceding control unit via the addressing line, wherein the mathematical operation comprises adding a constant of one to the address received to produce its own new address;

f) a non-volatile memory storage within each of the plurality of control units wherein the address of that control unit is stored internally within the control unit; and g) a transmitter within each of the plurality of control units that sends its address to a next subsequent control unit via the addressing line, and sends data blocks to the master or remote controller over the main broadcast line when the address of that control unit is specified by the master or remote controller;

whereupon when one of said plurality of control units fails, a new or replacement control unit will be installed and automatically re-address itself in the system whenever it receives the initial address from an immediately preceding control unit, performing the mathematical operation on that initial address to produce a new address, and storing the new address in the memory as its newly presented address in the control unit.

2. A self-addressing control unit comprising:

associated with a portion of a display sign sequence or array in a self-addressing control unit system for controlling the sequence or array, said system having a plurality of control units interconnected by a physical or logical parallel electrical bus having multiple connections to transfer data or power between the plurality of control units, wherein said electrical bus further comprises a main broadcast line, an addressing line and a feedback line to every control unit, said control unit comprising:

a) a receiver that receives an initial address from an immediately preceding control unit in the system along the addressing line;

b) a master or remote controller electrically interconnected with the plurality of control units by the electrical bus, wherein the master or remote controller transmits an initial address to a first of the plurality of control units on the addressing line of the bus; transmits data on the main broadcast line; and assigns an address to blocks of data, wherein each said assigned address represents the address of the control unit that processes the block of data;

c) a communication device associated with the master or remote controller for communicating a signal to the plurality of control units along the main broadcast line;

d) a calculator or computer that computes a new address for the control unit by performing a mathematical operation that changes the initial address received from the immediately preceding control unit via the addressing line, wherein the mathematical operation comprises adding a constant of one to the address received to produce its own new address;

e) a non-volatile memory storage that stores its new address; and, f) a transmitter that sends its new address to a next subsequent control unit via the addressing line, and sends data blocks from every control unit to the master or remote controller over the main broadcast line when the address of that control unit is specified by the master or remote controller;

whereupon when one of said plurality of control units fails, a new or replacement control unit will be installed and automatically re-address itself in the system whenever it receives the initial address from the immediately preceding control unit, performing the mathematical operation on that initial address to produce a new address, and storing the new address in the memory as its newly presented address in the control unit.

3. A method of networking a plurality of self-addressing control units for controlling a sequence of or an array of display signs comprising:

a) providing a plurality of control units each containing a non-volatile memory storage and each associating with a portion of the display sign array and all electrically interconnecting by a physical or logical parallel electrical bus having multiple connections, wherein said electrical bus further comprises a main broadcast line, an addressing line and a feedback line to every control unit, and said electrical bus transfers data or power between the control units;

b) providing a master or remote control electrically interconnecting with the plurality of control units by the electrical bus;

c) communicating with the master or remote controller for communicating a signal to the plurality of control units along the electrical bus by sending a system start-up signal from the controller along the main broadcast line to the plurality of control units wherein the master or remote controller transmits an initial address to a first of the plurality of control units on the addressing line of the bus; transmits data on the main broadcast line; and assigns an address to blocks of data, wherein each said assigned address represents the address of the control unit that processes the block of data;

d) causing each control unit to calculate an address associated with that control unit by receiving the initial address from an immediately preceding control unit, performing a mathematical operation on the initial address received to create a new address, wherein the mathematical operation comprises adding a constant of one to the received address to produce its own new address;

e) storing the new address in its non-volatile memory storage, and transmitting the new address to a next subsequent control unit via the addressing line and sending data blocks from every control unit to the master or remote controller over the main broadcast line when the address of that control unit is specified by the master or remote controller; and f) re-addressing whereupon one of said plurality of control units fails, a new or replacement unit will be installed and automatically re-address itself in the system by receiving the initial address from the immediately preceding control unit, performing the mathematical operation on that initial address to produce a new address, and storing the new address in the memory as its newly presented address in the control unit system.

* * * * *

UNITED STATES PATENT AND TRADEMARK OFFICE
Certificate

Patent No. 8,214,059 B1

Patented: July 3, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Richard J. Petrocy, Carteret, NJ (US).

Signed and Sealed this Third Day of September 2013.

MOHAMMAD ALI
*Supervisory Patent Examiner*
Art Unit 2127
Technology Center 2100